(12) United States Patent
Yoshino et al.

(10) Patent No.: US 11,502,831 B2
(45) Date of Patent: Nov. 15, 2022

(54) TRANSMITTING DEVICE, RECEIVING DEVICE, QUANTUM KEY DISTRIBUTION METHOD, AND QUANTUM KEY DISTRIBUTION PROGRAM FOR QUANTUM KEY DISTRIBUTION SYSTEM

(71) Applicants: NEC CORPORATION, Tokyo (JP); NATIONAL INSTITUTE OF INFORMATION AND COMMUNICATIONS TECHNOLOGY, Tokyo (JP); NATIONAL UNIVERSITY CORPORATION HOKKAIDO UNIVERSITY, Sapporo (JP)

(72) Inventors: Ken-ichiro Yoshino, Tokyo (JP); Mikio Fujiwara, Tokyo (JP); Masahide Sasaki, Tokyo (JP); Akihisa Tomita, Sapporo (JP)

(73) Assignees: NEC CORPORATION, Tokyo (JP); NATIONAL INSTITUTE OF INFORMATION AND COMMUNICATIONS TECHNOLOGY, Tokyo (JP); National University Corporation Hokkaido University, Sapporo (JP)

( * ) Notice: Subject to any disclaimer, the term of this patent is extended or adjusted under 35 U.S.C. 154(b) by 922 days.

(21) Appl. No.: 16/331,685

(22) PCT Filed: Aug. 31, 2017

(86) PCT No.: PCT/JP2017/031456
§ 371 (c)(1),
(2) Date: Mar. 8, 2019

(87) PCT Pub. No.: WO2018/047716
PCT Pub. Date: Mar. 15, 2018

(65) Prior Publication Data
US 2019/0245685 A1 Aug. 8, 2019

(30) Foreign Application Priority Data

Sep. 9, 2016 (JP) .............................. JP2016-176364

(51) Int. Cl.
*H04B 10/00* (2013.01)
*H04L 9/08* (2006.01)
(Continued)

(52) U.S. Cl.
CPC ......... *H04L 9/0858* (2013.01); *H04B 10/508* (2013.01); *H04B 10/516* (2013.01);
(Continued)

(58) Field of Classification Search
CPC .................................................... H04B 10/70
See application file for complete search history.

(56) References Cited

U.S. PATENT DOCUMENTS 8,718,485 B2   5/2014 Tanaka et al.
2010/0215370 A1   8/2010 Kobayashi et al.
(Continued)

FOREIGN PATENT DOCUMENTS

CN   104468097 A   3/2015
JP   2010-114488 A   5/2010
(Continued)

OTHER PUBLICATIONS

Communication dated Sep. 15, 2021 by the Japanese Patent Office in Japanese Application No. 2018-538385.
(Continued)

*Primary Examiner* — Daniel G Dobson
(74) *Attorney, Agent, or Firm* — Sughrue Mion, PLLC

(57) ABSTRACT

A quantum key distribution device is provided with an encoding unit which encodes an optical pulse train; an intensity modulating unit which subjects the encoded optical pulse train to N (where N is an integer at least equal to 3)
(Continued)

types of intensity modulation having mutually different intensities, with different timings; and a first key distillation processing unit which generates an encryption key on the basis of a data sequence obtained by removing data obtained from an optical pulse having a specific modulation pattern from a data sequence used by the encoding unit and the intensity modulating unit.

29 Claims, 10 Drawing Sheets

(51) Int. Cl.
| | |
|---|---|
| H04B 10/70 | (2013.01) |
| H04B 10/516 | (2013.01) |
| H04L 9/12 | (2006.01) |
| H04B 10/508 | (2013.01) |
| H04J 7/00 | (2006.01) |
| H04L 9/40 | (2022.01) |
| H04J 14/00 | (2006.01) |

(52) U.S. Cl.
CPC .............. H04B 10/70 (2013.01); H04J 7/00 (2013.01); H04L 9/08 (2013.01); H04L 9/12 (2013.01); H04L 63/1475 (2013.01)

(56) References Cited

U.S. PATENT DOCUMENTS

| | | | |
|---|---|---|---|
| 2014/0105598 A1 | 4/2014 | Lucamarini et al. | |
| 2015/0304106 A1* | 10/2015 | Yoshino | H04L 9/0852 |
| | | | 250/204 |
| 2018/0269989 A1* | 9/2018 | Murakami | H04B 10/516 |

FOREIGN PATENT DOCUMENTS

| | | |
|---|---|---|
| JP | 2014-131259 A | 7/2014 |
| JP | 2015-122675 A | 7/2015 |

OTHER PUBLICATIONS

Yuichi Nagamatsu et al., "Security of quantum key distribution with non-I.I.D. light sources", Phys. Rev. A 93, 042325, Quantum Physics (quant-ph), 2016, pp. 1-10, Retrieved from URL:<https://arxiv.org/pdf/1602.02914.pdf> (10 pages total).

Communication dated Mar. 30, 2020 from the European Patent Office in application No. 17848656.9.

Haodong, J., et al., "Four-intensity Decoy-state Quantum Key Distribution with Enhanced Resistance against Statistical Fluctuation", ARXIV.org, Cornell University Library, Ithaca, NY, Feb. 8, 2015, XP080677317, 19 pages.

Charles H. Bennett, "Quantum Cryptography: Public Key Distribution and Coin Tossing", International Conference on Computers, Systems & Signal Processing, Dec. 9-12, 1984, 7 pages, Bangalore, India.

Norbert Lukenhaus, "Security against individual attacks for realistic quantum key distribution", Physical Review A, 2000, pp. 052304-1-052304-10, vol. 61, 052304.

Won-Young-Hwang, "Quantum Key Distribution with High Loss: Toward Global Secure Communication", Physical Review Letters, Aug. 1, 2003, pp. 057901-1-057901-4, vol. 91, No. 5.

Written Opinion for PCT/JP2017/031456, dated Nov. 14, 2017.

International Search Report for PCT/JP2017/031456, dated Nov. 14, 2017.

Communication dated Jul. 30, 2021, from the China National Intellectual Property Administration in application No. 201780055436.2.

* cited by examiner

|  | INTENSITY (PHOTON NUMBERS/PULSE) | INTENSITY RATIO (BASED ON S) | MIXING PERCENTAGE |
| --- | --- | --- | --- |
| SIGNAL LIGHT S | 0.5 | 1 | 90% |
| DECOY LIGHT D | 0.2 | 0.4 | 5% |
| DECOY LIGHT V | 0 | 0 | 5% |

FIG. 6

| PATTERN | USE·NONUSE | PATTERN | USE·NONUSE | PATTERN | USE·NONUSE |
|---|---|---|---|---|---|
| S→S | USE | S→D | USE | S→V | USE |
| D→S | USE | D→D | NONUSE | D→V | USE |
| V→S | USE | V→D | NONUSE | V→V | USE |

FIG. 9

TRANSMITTING DEVICE, RECEIVING DEVICE, QUANTUM KEY DISTRIBUTION METHOD, AND QUANTUM KEY DISTRIBUTION PROGRAM FOR QUANTUM KEY DISTRIBUTION SYSTEM

CROSS REFERENCE TO RELATED APPLICATIONS

This Application is a National Stage of International Application No. PCT/JP2017/031456 filed Aug. 31, 2017, claiming priority based on Japanese Patent Application No. 2016-176364 filed Sep. 9, 2016, the disclosure of which is incorporated herein in its entirety by reference.

TECHNICAL FIELD

This invention relates to a transmitting device, a receiving device, a quantum key distribution method, and a quantum key distribution program for a quantum key distribution system.

BACKGROUND ART

In recent years, as a method for achieving encrypted communication having absolute safety against an eavesdropping action, quantum key distribution (Quantum Key Distribution, QKD) (Non-Patent Document 1) has been actively studied and developed for practical use.

Non-Patent Document 1 proposes to use a single-photon light source as a light source for the QKD. At the present stage, however, the single-photon light source is on the road to development and does not reach a practical level. Therefore, as a substitute for the single-photon light source, the mainstream is a method of using, as a pseudo-single-photon light source, a laser light source having a weakened intensity obtained by extremely weakening an intensity of a general laser light source.

However, in a case of the laser light source, which is different from an ideal single-photon light source, two or more photons are generated in one pulse at a constant probability. As a result, there is a possibility of being subjected to an eavesdropping attack called a photon number splitting attack (Photon Number Splitting attack, PNS attack) in which information corresponding to one photon is eavesdropped from two or more photons. Therefore, it is pointed out that, in a case where the laser light source is used, safety of the QKD is significantly detracted (Non-Patent Document 2).

Thus, as means for avoiding the PNS attack, a decoy method is proposed (Non-Patent Document 3). The decoy means a "lure" and the decoy method is a method which can detect presence or absence of the PNS attack by changing, at intervals, an intensity of optical pulses used in the QKD. It is considered that implementation of the decoy method is important in recent development of practical QKD.

In order to implement the decoy method into the QKD, it is necessary to use three or more types of optical intensities. It is known that, in the decoy method, the safety of the QKD is improved when a greater number of types of the intensities are used. However, taking the degree of difficulty of implementation into account, in general, the three types of optical intensities are frequently used in the decoy method. For that reason, description will hereinafter be made about the decoy method using the three types of optical intensities.

It is assumed that s, d, and v represent average photon numbers contained per one pulse in optical pulses of the three types of optical intensities, respectively. Herein, s is equal to about 0.5 [photons/pulse] in a case of a typical QKD system for 50 km transmission. d is equal to about 40% of s, namely, d is equal to about 0.2 and v is equal to 0 (vacuum). In this case, optical pulses of the average photon number s are used as signal lights and information obtained from the signal lights is used as a quantum encryption key. The optical pulses of the average photon numbers d and v are used as decoy lights (which may also be called decoy pulses) for detecting the eavesdropping. That is, in the decoy method, the optical pulses having the largest intensity among the three types of the optical pulses are used as the signal lights. Hereinafter, "optical pulses of the average photon number s (d or v)" will simply be represented as S (D or V). In the QKD system using the decoy method, most of transmission pulses are S and the eavesdropping is detected by mixing D and V as a part thereof. As a typical example, in the transmission pulses, S is about 90%, D is about 5%, and V is about 5%.

FIG. 1 is a schematic view showing an example of a train of optical pulses transmitted in the decoy method. As shown in FIG. 1, the train of optical pulses comprises S as a large number of signal lights and V and D as a small number of decoy pulses.

PRIOR ART DOCUMENT(S)

Non-Patent Document(s)

Non-Patent Document 1: Bennett and Brassard, IEEE Int. Conf. on Computers, Systems, and Signal Processing, Bangalore, India, p. 175 (1984)
Non-Patent Document 2: N. Lutkenhaus, Physical Review A, Vol. 61, 052304 (2000)
Non-Patent Document 3: W. Y. Hwang, Physical Review Letters, Vol. 91, 057901 (2003)

SUMMARY OF THE INVENTION

Problem to be Solved by the Invention

In a case where the decoy method is used in the quantum key distribution, it is known that, when the intensity of the optical pulses fluctuates, an amount of information leakage to an eavesdropper increases and a generation efficiency of an encryption key significantly degrades. Specifically, when the intensity of the decoy pulses D fluctuates by 5%, the generation efficiency of the encryption key degrades to about 50% in comparison with a case of no fluctuation in the decoy pulses D.

On the other hand, a recent quantum key distribution system uses a high-speed electronic circuit operable with a clock frequency exceeding 1 GHz. Since a distortion occurs in a waveform of a modulation signal, a phenomenon called a pattern effect occurs. The pattern effect is a phenomenon in which a modulation signal for a pulse changes depending on a previous modulation pattern.

FIG. 2 is a schematic view for use in describing the pattern effect, (a) shows a modulation signal in an ideal electronic circuit without the pattern effect, and (b) shows a modulation signal in a real electronic circuit with the pattern effect. In FIG. 2 (a) and FIG. 2 (b), the axis of abscissas represents a time while the axis of ordinate represents a voltage.

FIG. 2 (a) illustrates a modulation signal 201a, a first optical pulse 202a and a second optical pulse 203a as optical pulses to be modulated, a first modulation signal 204a for the first optical pulse 202a, and a second modulation signal 205a for the second optical pulse 203a. As shown in FIG. 2 (a), the first modulation signal 204a and the second modulation signal 205a have waveforms of the same shape as each other.

FIG. 2 (b) illustrates a modulation signal 201b, a first optical pulse 202b and a second optical pulse 203b as optical pulses to be modulated, a first modulation signal 204b for the first optical pulse 202b, and a second modulation signal 205b for the second optical pulse 203b. As shown in FIG. 2 (b), in the real electronic circuit, distortion occurs in the modulation signal 201b due to band limitation of wiring and so on. Due to the distortion, when the modulation is performed on the first optical pulse 202b and the second optical pulse 203b as the same optical pulse, the first modulation signal 204b and the second modulation signal 205b as respective modulation signals thereof have waveforms which are different from each other. In FIG. 2 (b), the modulation signal changes depending on a preceding modulation pattern. Such phenomenon is called the pattern effect. Thus, in the decoy method, even if the optical pulses are subjected to the same intensity modulation, the intensity may fluctuate depending on which one of the three types has been a preceding pulse intensity. The fluctuation of the optical pulse intensity due to the pattern effect may reach about 20%. Therefore, a generation efficiency of the encryption key may possibly degrade significantly.

It is an object of this invention to provide a transmitting device, a receiving device, a quantum key distribution method, and a quantum key distribution program for a quantum key distribution system which are capable of suppressing degradation of a generation efficiency of an encryption key when a decoy method is used.

Means to Solve the Problem

A transmitting device for a quantum key distribution system according to a first aspect of the present invention comprises an encoding unit configured to encode a train of optical pulses; an intensity modulating unit configured to subject a train of encoded optical pulses to N types of intensity modulation having mutually different intensities, with different timings, where N is an integer which is not less than three; and a first key distillation processing unit configured to generate an encryption key based on a data sequence obtained by removing data obtained from optical pulses having a specific modulation pattern from a data sequence used when the encoding unit and the intensity modulating unit carry out encoding and intensity modulation.

A receiving device for a quantum key distribution system according to a second aspect of the present invention comprises a decoding unit configured to receive, from a transmitting device, a train of optical pulses which has been encoded and subjected to N types of intensity modulation having mutually different intensities, with different timings, where N is an integer which is not less than three, the decoding unit producing a data sequence obtained by decoding the train of optical pulses; and a second key distillation processing unit configured to generate an encryption key based on a data sequence obtained by removing data obtained from optical pulses having a specific modulation pattern from the data sequence obtained by the decoding.

A quantum key distribution method according to a third aspect of the present invention comprises generating an encryption key based on a data sequence obtained by removing data obtained from optical pulses having a specific modulation pattern from a data sequence used when a train of optical pulses are subjected to encoding and N types of intensity modulation having mutually different intensities, where N is an integer which is not less than three.

A quantum key distribution method according to a fourth aspect of the present invention comprises receiving, from a transmitting device, a train of optical pulses which has been encoded and subjected to N types of intensity modulation having mutually different intensities, with different timings, where N is an integer which is not less than three, to produce a data sequence obtained by decoding the train of optical pulses, and generating an encryption key based on a data sequence obtained by removing data obtained from optical pulses having a specific modulation pattern from the data sequence obtained by the decoding.

A quantum key distribution program according to a sixth aspect of the present invention makes a computer function as means for generating an encryption key based on a data sequence obtained by removing data obtained from optical pulses having a specific modulation pattern from a data sequence used when a train of optical pulses are subjected to encoding and N types of intensity modulation having mutually different intensities, where N is an integer which is not less than three.

A quantum key distribution program according to a sixth aspect of the present invention makes a computer function as means for generating an encryption key based on a data sequence obtained by removing data obtained from optical pulses having a specific modulation pattern from a data sequence obtained by decoding a train of optical pulses which has been encoded and subjected to N types of intensity modulation having mutually different intensities, with different timings, where N is an integer which is not less than three.

Effect of Invention

According to this invention, it is possible to suppress degradation of a generation efficiency of an encryption key when a decoy method is used.

BRIEF DESCRIPTION OF THE DRAWINGS

FIG. 6 is a table for illustrating an intensity, an intensity ratio, and a mixing percentage of a signal light and decoy pulses according to the example embodiment of the present invention;

FIG. 9 is a table for illustrating an example of a pattern disposal processing method according to the example embodiment of the present invention.

MODES FOR EMBODYING THE INVENTION

[Concept of the Invention]
(Quantum Key Distribution Device)

Figure 1:
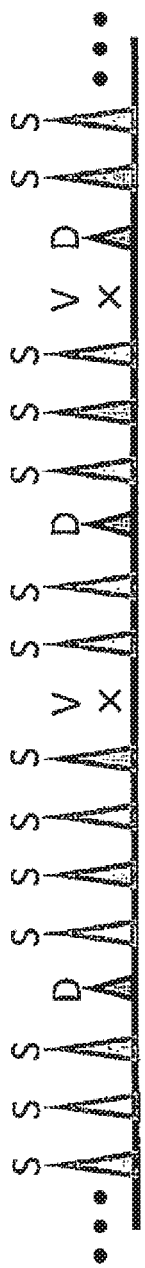
FIG. 1 is a schematic view for illustrating one example of a train of optical pulses transmitted according to a decoy method.
Figure 2:
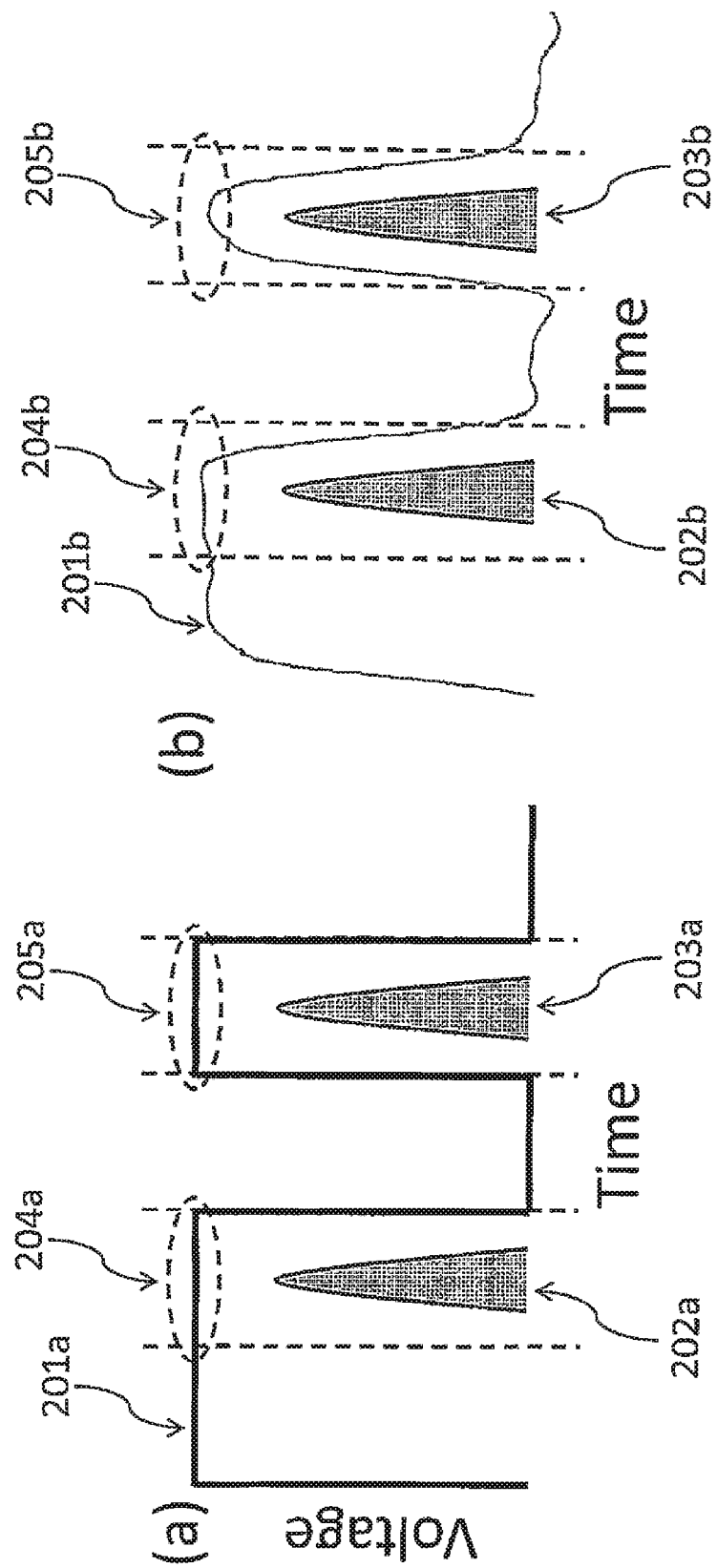
FIG. 2 is a schematic view for use in describing a pattern effect, (a) shows a modulation signal of an ideal electronic circuit, and (b) shows a modulation signal of a real electronic circuit.
Figure 3:
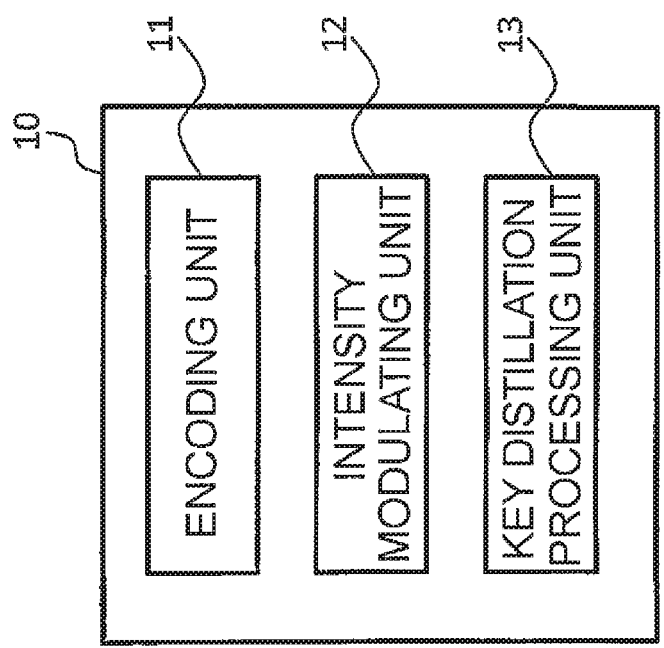
FIG. 3 is a block diagram for use in explaining a concept of a quantum key distribution device of the present invention.

Now, a concept of the present invention will be described before explaining an example embodiment of the present invention. FIG. 3 is a block diagram for illustrating a configuration of a transmitting device 10 in a quantum key distribution system for use in explaining the concept of the present invention.

The transmitting device 10 comprises an encoding unit 11, an intensity modulating unit 12, and a key distillation processing unit 13. The encoding unit 11 encodes optical pulses according to a quantum key distribution protocol, for example, BB84. The intensity modulating unit 12 subjects a train of optical pulses encoded by the encoding unit 10 to N types of intensity modulation having mutually different intensities, to deliver outputs to the key distillation processing unit 13, where N represents an integer which is not less than three. Specifically, the intensity modulating unit 12 applies intensity modulation to the optical pulses in accordance with the decoy method. The key distillation processing unit 13 generates an encryption key on the basis of a data sequence obtained by removing data obtained from optical pulses having a specific modulation pattern from a data sequence used on encoding by the encoding unit 11 and a data sequence used in the intensity modulating unit 12. Thus, the transmitting device 10 can suppress degradation of a generation efficiency of an encryption key when the decoy method is used in the quantum key distribution system.

(Quantum Key Distribution System)

Figure 4:
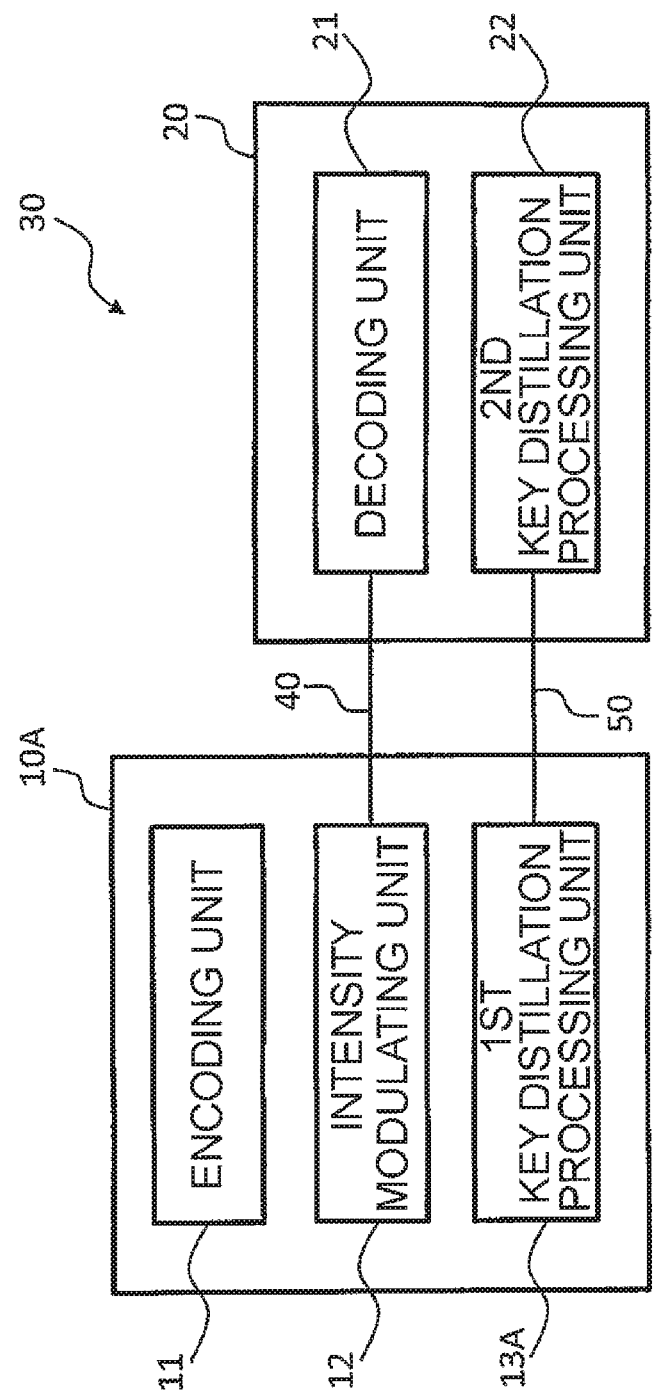
FIG. 4 is a block diagram for use in explaining a concept of a quantum key distribution system of the present invention.

Next, description will proceed to a concept of a quantum key distribution system according to the present invention. FIG. 4 is block diagram for illustrating a configuration of a quantum key distribution system 30 for use in explaining the concept of the present invention.

The quantum key distribution system 30 comprises a transmitting device 10A and a receiving device 20.

The transmitting device 10A comprises the encoding unit 11, the intensity modulating unit 12, and a first key distillation processing unit 13A. The transmitting device 10A subjects the optical pulses to processing similar to that in the above-mentioned transmitting device 10.

The receiving device 20 comprises a decoding unit 21 and a second key distillation processing unit 22. The decoding unit 21 and the intensity modulating unit 12 are connected via an optical network 40. Such an optical network 40 may comprise an optical fiber or the like. In this case, the decoding unit 21 receives, via the optical network 40, the train of optical pulses which has been encoded and subjected to the intensity modulation and decodes the train of optical pulses. The second key distillation processing unit 22 and the first key distillation processing unit 13A are connected via a communication network 50. Such a communication network 50 may comprise a normal Internet network or the like. The first key distillation processing unit 13A and the second key distillation processing unit 22 carry out, via the transmission network 50, transmission and reception of necessary information for generating the encryption key. The necessary information for generating the encryption key comprises information related to random number data used when the train of optical pulses is subjected to the encoding and the intensity modulation, information related to a basis used for measurement of the train of optical pulses, and the like. Consequently, the second key distillation processing unit 22 receives, from the first key distillation processing unit 13A, the necessary information for generating the encryption key. The second key distillation processing unit 22 generates, based on the information received from the decoding unit 21 and the information received from the first key distillation processing unit 13A, the encryption key on the basis of a data sequence obtained by removing data obtained from the optical pulses having the specific modulation pattern from a data sequence of a train of optical pulses which has been decoded by the decoding unit 21.

Example Embodiment

Now, an example embodiment of the present invention will be described in detail with reference to the drawings. Herein, description will be simplified or omitted as appropriate about configurations and operations having a weak relationship to the present invention.

Figure 5:
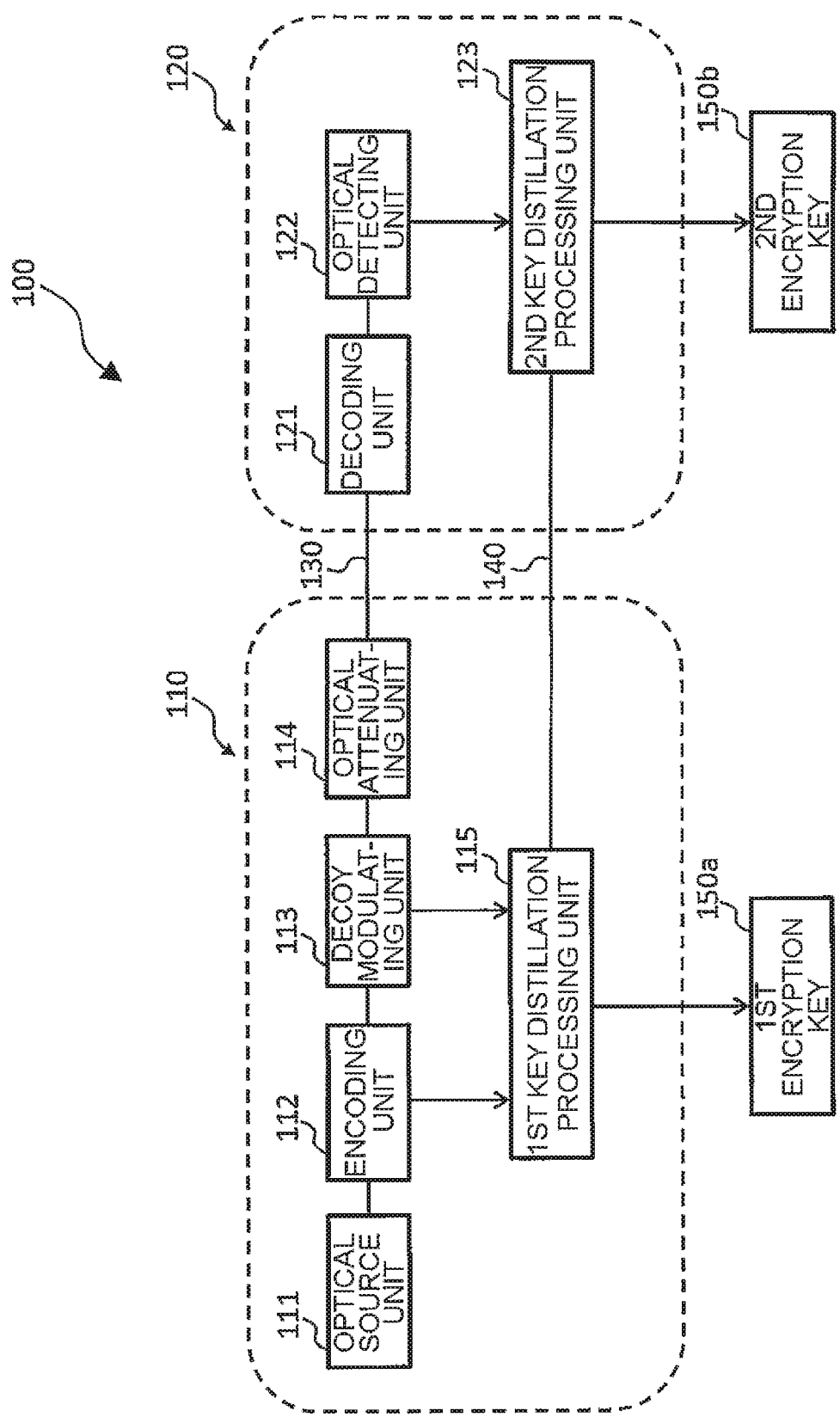
FIG. 5 is a block diagram for illustrating a configuration of a quantum key distribution system according to an example embodiment of the present invention.

FIG. 5 is a block diagram for illustrating a configuration of the quantum key distribution system according to an example embodiment of the present invention. As shown in FIG. 5, the quantum key distribution system 100 comprises a transmitting device 110 and a receiving device 120. Each of unidirectional arrows in FIG. 5 simply depicts a direction of flow of a signal (data) without excluding bidirectionality.

At first, the transmitting device 110 will be described. The transmitting device 110 comprises an optical source unit 111, an encoding unit 112, a decoy modulating unit 113, an optical attenuating unit 114, and a first key distillation processing unit 115.

The optical source unit 111 comprises, for example, a semiconductor laser and supplies the encoding unit 112 with optical pulses having any desired wavelength and intensity.

The encoding unit 112 encodes the optical pulses supplied from the optical source unit 111 in accordance with the quantum key distribution protocol. Herein, the quantum key distribution protocol comprises, for example, a BB84 protocol. In the example embodiment, the encoding unit 112 comprises, for example, a Mach-Zehnder interferometer and a phase modulator.

The decoy modulating unit 113 subjects the optical pulses received from the encoding unit 112 to the total three types of intensity modulation having mutually different intensities of a signal light S, a decoy pulse D and a decoy pulse V to produce a train of optical pulses comprising a plurality of optical pulses which have been subjected to the intensity modulation. As the decoy modulating unit 113 mentioned above, for example, an LN (Lithium Niobate) intensity modulator comprising a combination of a Mach-Zehnder interferometer and a phase modulator may be used.

Referring now to FIG. 6, description will proceed to an intensity, an intensity ratio, and a mixing percentage of each of S, D, and V according to the example embodiment. FIG. 6 is a table showing an example of the intensity, the intensity ratio, and the mixing percentage of each of S, D, and V according to the example embodiment.

In the example embodiment, it is assumed that S has the intensity of 1. In this event, D and V have the intensities of 0.4 and 0, respectively. The train of optical pulses includes S at a percentage of 90%, D at a percentage of 5%, and V at a percentage of 5%. That is, in the example embodiment, 90% of the train of optical pulses is used as the signal light while remaining 10% thereof is used as the decoy pulses. The intensity, the intensity ratio, and the mixing percentage of each of S, D, and V shown in FIG. 6 are one example, and the present invention is not limited thereto.

FIG. 5 is referred again. The optical attenuating unit 114 attenuates the train of optical pulses supplied from the decoy modulating unit 113 to a suitable optical intensity in order to transmit the train of the optical pulses to the receiving device 120. Such an optical attenuating unit 114 may comprise, for example, a variable optical attenuator. An attenuation amount in the optical attenuating unit 114 is preliminarily set according to a design of the quantum key distribution system 100 but may be adjusted appropriately. The optical attenuating unit 114 may comprise, for example, an optical detecting unit. In this event, the optical attenuating unit 114 may adjust the attenuation amount in accordance with an intensity of pulses detected by the optical detecting unit.

The first key distillation processing unit 115 generates a first encryption key 150a as an encryption key in the transmitting device 110. The first key distillation processing unit 115 receives, from the encoding unit 112 and the decoy modulating unit 113, information (random number data or the like) used on encoding and on the intensity modulation, respectively. A configuration of the first key distillation processing unit 115 and details of processing for generating the first encryption key 150a will later be described.

Next, description will proceed to the receiving device 120. The receiving device 120 comprises a decoding unit 121, an optical detecting unit 122, and a second key distillation processing unit 123. The decoding unit 121 and the optical attenuating unit 114 of the transmitting device 110 are connected via an optical network 130 which comprises an optical fiber or the like. The second key distillation processing unit 123 and the first key distillation processing unit 115 of the transmitting device 110 are connected via a communication network 140 such as a normal Internet network.

The decoding unit 121 receives the train of optical pulses from the transmitting device 110 via the optical network 130 and decodes the train of optical pulses through a process inverse to the method used on encoding by the encoding unit 112.

In response to the train of optical pulses which has been decoded, the optical detecting unit 122 measures information of a photon number with respect to the train of optical pulses which has been received and delivers measured data to the second key distillation processing unit 123.

The second key distillation processing unit 123 generates a second encryption key 150b as an encryption key in the receiving device 120. Herein, the second encryption key 150b is the same encryption key as the first encryption key 150a generated by the first key distillation processing unit 115. A configuration of the second key distillation processing unit 123 and processing for generating the second encryption key 150b will later be described.

Next, description will be made in detail about the configurations of the first key distillation processing unit 115 and the second key distillation processing unit 123 and processing for generating the encryption key.

The first key distillation processing unit 115 generates a sifted key based on random number data used on the encoding and the decoy modulation of the optical pulses. The second key distillation processing unit 123 generates a sifted key based on detected data detected by the optical detecting unit 122 after decoding. The first key distillation processing unit 115 and the second key distillation processing unit 123 generate the first encryption key 150a and the second encryption key 150b, each of which is finally safe, respectively, by subjecting the sifted key to error correction and privacy amplification. The first key distillation processing unit 115 and the second key distillation processing unit 123 mutually transmit and receive, via the communication network 140, the necessary information, possessed by the respective units, for generating the encryption key. Normally, the quantum key distribution system generates the encryption key based on the sifted key which is generated in accordance with a result obtained by verifying a basis selected at a transmitting side and a receiving side. However, this example embodiment is characterized by further performing, after generating the sifted key in accordance with the result obtained by verifying the basis, processing in which data obtained from the optical pulses of a specific modulation pattern are disposed of from the sifted key without being used for generating the encryption key (pattern disposal processing).

Figure 7:
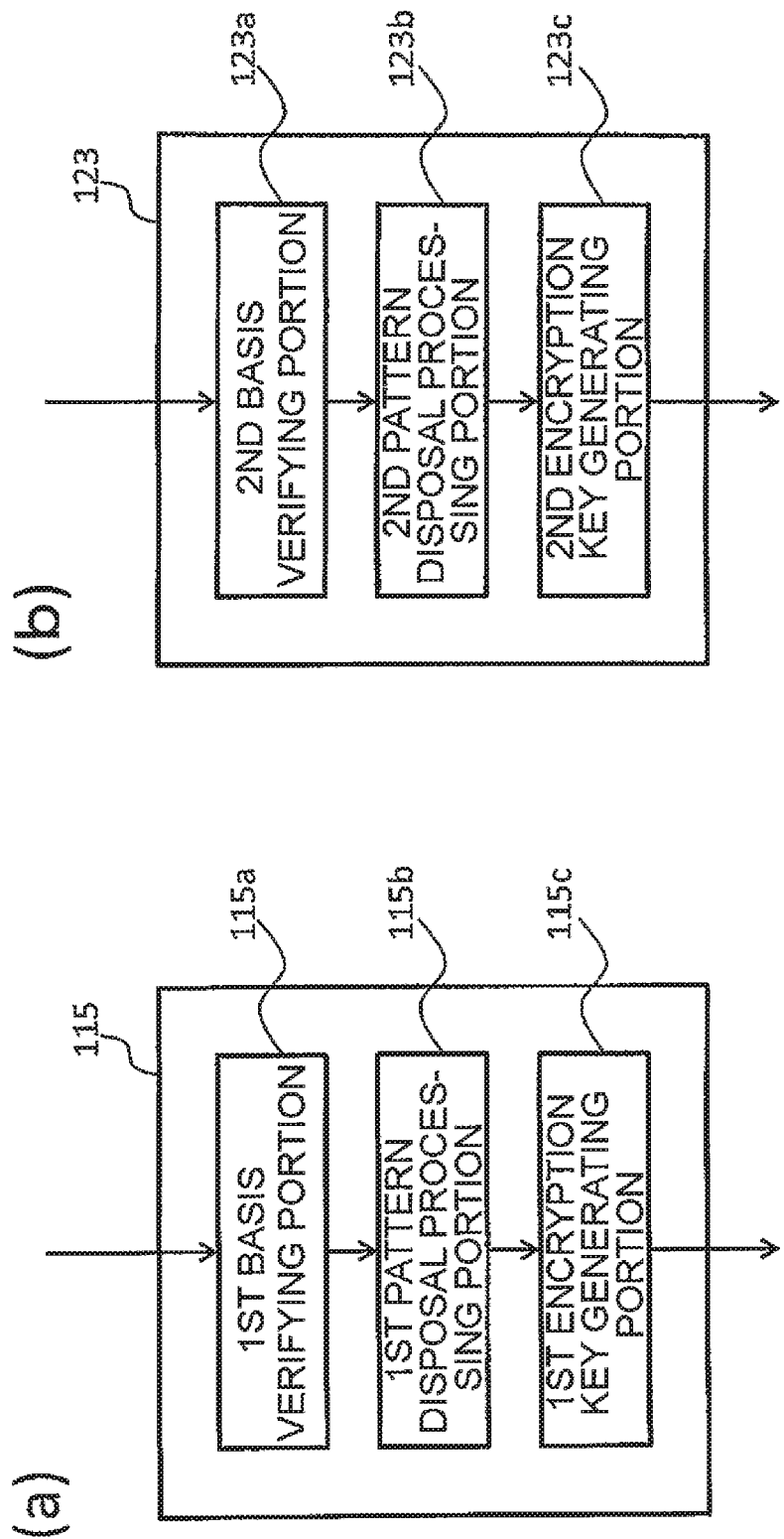
FIG. 7 is a block diagram for illustrating configurations of key distillation processing units according to the example embodiment of the present invention, (a) shows a key distillation processing unit provided in a transmission-side quantum key distribution device, and (b) shows a key distillation processing unit provided in a reception-side quantum key distribution device.

FIG. 7 is a block diagram for illustrating configurations of key distillation processing units according to the example embodiment of the present invention. (a) shows the configuration of the first key distillation processing unit 115, and (b) shows the configuration of the second key distillation processing unit 123. Each of unidirectional arrows in FIG. 7 simply depicts a direction of flow of a signal (data) without excluding bidirectionality.

As shown in FIG. 7 (a), the first key distillation processing unit 115 comprises a first basis verifying portion 115a, a first pattern disposal processing portion 115b, and a first encryption key generating portion 115c. As shown in FIG. 7 (b), the second key distillation processing unit 123 comprises a second basis verifying portion 123a, a second pattern disposal processing portion 123b, and a second encryption key generating portion 123c.

Figure 8:
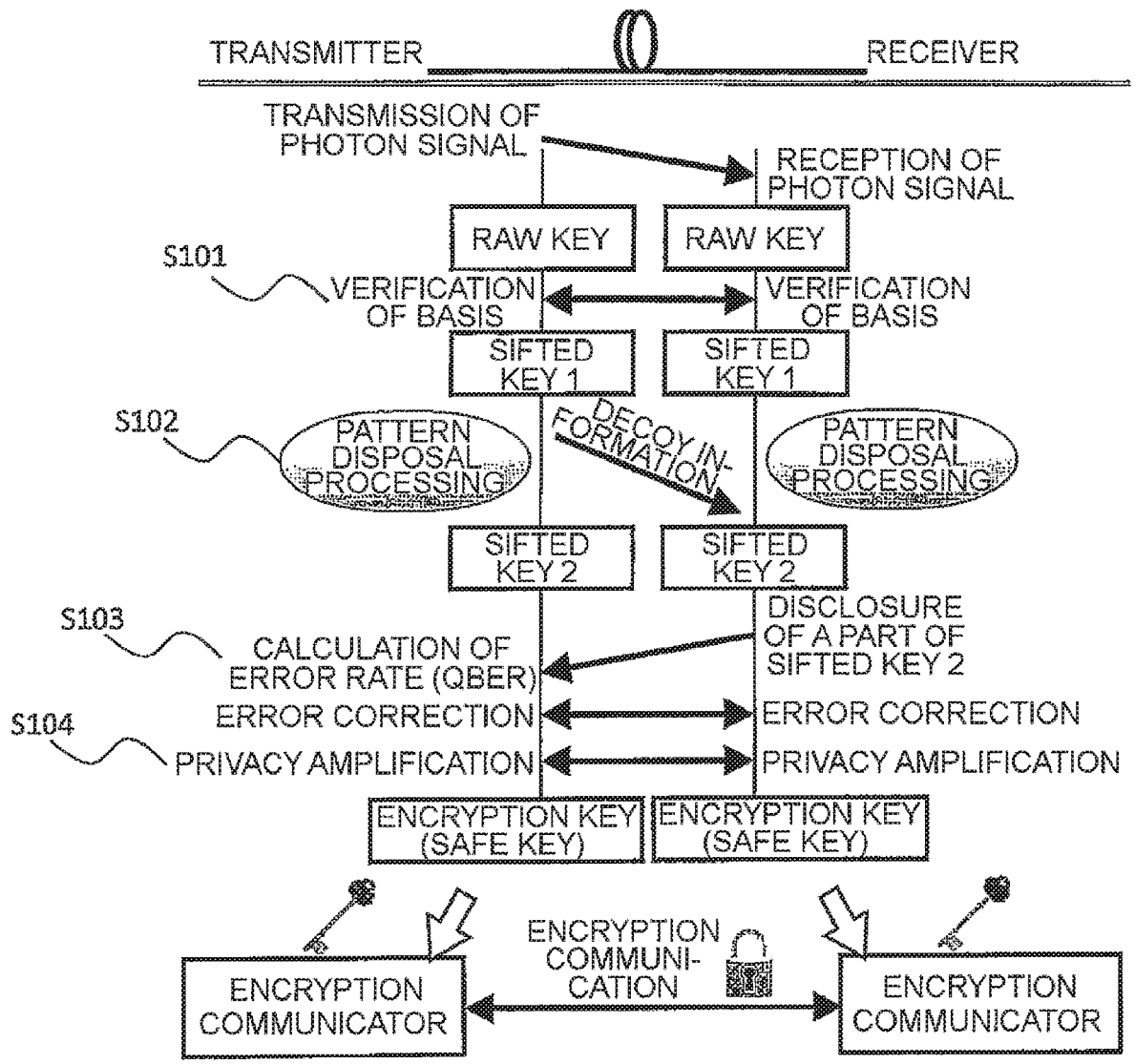
FIG. 8 is a flow chart for illustrating a flow of processing up to generation of an encryption key according to the example embodiment of the present invention.

FIG. 8 is a flow chart for illustrating a flow of processing in which the first key distillation processing unit 115 and the second key distillation processing unit 123 according to the example embodiment generate the encryption keys.

Referring now to FIGS. 7 and 8, description will be made in detail about the processing of generating the encryption keys by the first key distillation processing unit 115 and the second key distillation processing unit 123.

First of all, the first basis verifying portion 115a and the second basis verifying unit portion 123a transmit and receive information of the bases used by these portions, respectively. Each of the first basis verifying portion 115a and the second basis verifying portion 123a generates a first sifted key in accordance with a result obtained by verifying the basis (step S101).

Subsequently, the first pattern disposal processing portion 115b and the second pattern disposal processing portion 123b generate a second sifted key by subjecting the first sifted key to the pattern disposal processing (step S102). In this event, the second key distillation processing unit 123 receives, from the first key distillation processing unit 115 via the communication network 140, decoy information (random number data) used when the decoy modulating unit 113 carries out the intensity modulation. Thus, the second pattern disposal processing portion 123b can subject the first sifted key to processing similar to that in the first pattern disposal processing portion 115b and can generate the second sifted key.

Referring now to FIG. 9, description will be made about, as one example of the pattern disposal processing according to the example embodiment, an example where the influence of the pattern effect is removed when the intensity fluctuation is large due to the pattern effect of the decoy pulse D. FIG. 9 is a table showing an example of the optical pulses to which the pattern disposal processing is applied. In FIG. 9, for example, D→S means the signal light S which is transmitted immediately after the decoy pulse D. Specifically, in the example illustrated in FIG. 9, among the decoy pulses D, the decoy pulse D (S→D) transmitted immediately after the signal light S is used while the decoy pulses D (D→D and V→D) transmitted immediately after the decoy pulse D and the decoy pulse V are disposed of without being used. Consequently, any signal immediately before the decoy pulse D is fixed to the signal light S. Therefore, it is possible to substantially remove the influence of the pattern effect even if the pattern effect of the decoy pulse D is large. This is because the modulation signal changes in dependence upon the preceding modulation pattern due to the pattern effect as described above.

FIGS. 7 and 8 are referred to again. The first encryption key generating portion 115c calculates an error rate (QBER: Quantum Bit Error Rate) included in the second sifted key (step S103). Specifically, the first encryption key generating portion 115c receives, via the communication network 140, information of at least a part of the second sifted key generated by the second pattern disposal processing portion 123b. Then, the first encryption key generating portion 115c calculates the error rate by comparing the second sifted keys which are generated at the transmitting side and the receiving side.

Finally, the first encryption key generating portion 115c and the second encryption key generating portion 123c generate safe encryption keys by subjecting the second sifted keys to the error correction and the privacy amplification based on the error rate.

Although the pattern disposal processing is carried out after the basis is verified in the example embodiment of the present invention, the present invention is not limited thereto. In the present invention, the encryption key may be generated by verifying the basis after carrying out the pattern disposal processing.

In the example embodiment of the present invention, the number of acquired data decreases because the pattern disposal processing portions dispose of a part of pulses. However, a percentage of patterns D→D and V→D disposed of in the above-mentioned example with respect to the transmission pulses is equal to 5%×5%+5%×5%=0.5% as calculated from the transmission percentage illustrated in FIG. 6. Therefore, even if the patterns D→D and V→D are disposed of, the influence on the number of data as a whole is small. Accordingly, by the above-mentioned method, it is possible to substantially remove the pattern effect and to avoid the degradation of the generation efficiency of the encryption key.

The present invention is not limited to the decoy method using three types of intensities, but may be applicable to a case where four or more types of intensities are used. In addition, the present invention is not limited to only the pattern effect due to preceding modulation, but may be applicable to a case where the pattern effect occurs due to second or more preceding modulation or due to first or more succeeding modulation. In other words, the present invention may be applicable to a case where there are a current optical pulse and the pattern effect due to modulation occurs on an M-th preceding or an M-th succeeding optical pulse preceding or succeeding the current optical pulse, where M represents an integer which is not less than one.

Other Example Embodiments

In the quantum key distribution system, the first key distillation processing unit 115 and the second key distillation processing unit 123 may be implemented by hardware or may be implemented by software. In addition, the first key distillation processing unit 115 and the second key distillation processing unit 123 may be implemented by a combination of hardware and software.

Figure 10:
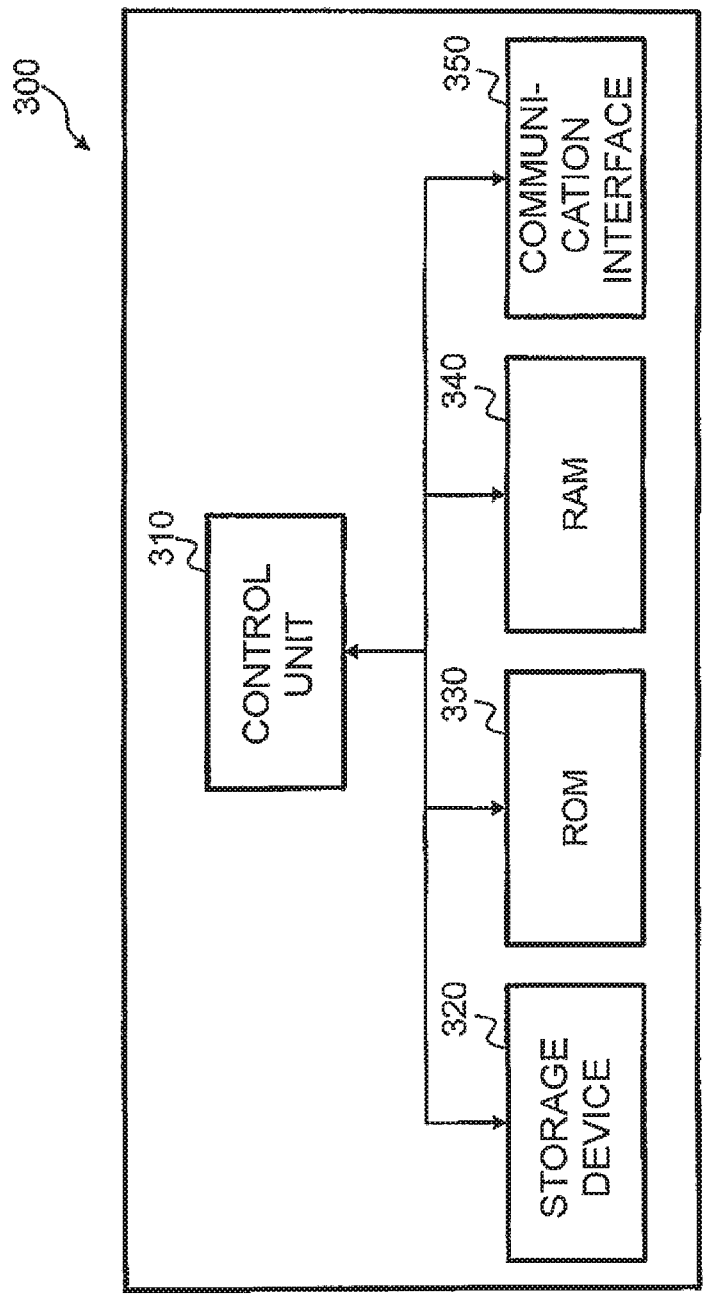
FIG. 10 is a block diagram for illustrating a configuration of an information processing apparatus configuring the key distillation processing unit according to the example embodiment of the present invention.

FIG. 10 is one example of an information processing apparatus (computer) constituting the first key distillation processing unit 115 and the second key distillation processing unit 123.

As shown in FIG. 10, the information processing apparatus 300 comprises a control unit 310, a storage device 320, an ROM (Read Only Memory) 330, an RAM (Random Access Memory) 340, and a communication interface 350.

The control unit 310 may comprise a processing unit such as a CPU (Central Processing Unit). The control unit 310 may implement respective portions constituting the first key distillation processing unit 115 and the second key distillation processing unit 123 by developing a program, which is held in the storage device 320 or the ROM 330 and which is readable by the control unit 310, in the RAM 340 and by executing the program. In addition, the control unit 310 may comprise an internal buffer which is adapted to temporarily store data or the like.

The storage device 320 comprises a bulk storage medium which can hold various types of data and may be implemented by a storage medium such as a magneto-optical disc, an HDD (Hard Disk Drive), and an SSD (Solid State Drive). The storage device 320 may be a cloud storage existing in a communication network when the information processing apparatus 300 is connected to a communication network via the communication interface 350. The storage device 320 may hold the program readable by the control unit 310.

The ROM 330 comprises a nonvolatile storage device which may comprise a flash memory having a small capacity as compared to the storage device 320. The ROM 330 may hold a program which is readable by the control unit 310. The program readable by the control unit 310 may be held in at least one of the storage device 320 and the ROM 330.

The RAM 340 comprises a semiconductor memory such as a DRAM (Dynamic Random Access Memory) and an SRAM (Static Random Access Memory) and may be used as an internal buffer which temporarily stores data and so on.

The communication interface 350 is an interface which connects the information processing apparatus 300 and the communication network via wire or wirelessly.

A part or a whole of the example embodiments described above may also be described as the following supplementary notes. It is noted that the following supplementary notes never limit the present invention.

(Supplementary Note 1)

A transmitting device for a quantum key distribution system, comprising:

an encoding unit configured to encode a train of optical pulses;

an intensity modulating unit configured to subject a train of encoded optical pulses to N types of intensity modulation having mutually different intensities, with different timings, where N is an integer which is not less than three; and a first key distillation processing unit configured to generate an encryption key based on a data sequence obtained by removing data obtained from optical pulses having a specific modulation pattern from a data sequence used when the encoding unit and the intensity modulating unit carry out encoding and intensity modulation.

(Supplementary Note 2)

The transmitting device according to Supplementary Note 1, wherein the first key distillation processing unit is configured to determine data to be removed among the train of optical pulses based on data obtained from a current optical pulse and data obtained from an M-th preceding or an M-th succeeding optical pulse preceding or succeeding the current optical pulse, where M is an integer which is not less than one.

(Supplementary Note 3)

The transmitting device according to Supplementary Note 1 or 2, wherein the first key distillation processing unit includes a decoy pulse as the modulation pattern and is configured to dispose of data having large intensity fluctuation.

(Supplementary Note 4)

The transmitting device according to any one of Supplementary Notes 1 to 3, wherein the first key distillation processing unit is configured to dispose of at least data having the largest intensity fluctuation due to a pattern effect.

(Supplementary Note 5)

The transmitting device according to any one of Supplementary Notes 1 to 4, wherein the first key distillation processing unit comprises a first basis verification processing portion, a first pattern disposal processing portion, and a first encryption key generating portion, wherein the first basis verification processing portion is configured to generate a first sifted key based on a basis which is given to the data sequence of the train of optical pulses, wherein the first pattern disposal processing portion is configured to generate a second sifted key from the first sifted key based on a data sequence obtained by removing, from the data sequence of the train of optical pulses, data obtained from a train of optical pulses having the specific modulation pattern, wherein the first encryption key generating portion is configured to generate the encryption key by calculating an error rate (QBER: Quantum Bit Error Rate) included in the second sifted key and by carrying out error correction and privacy amplification on the second sifted key based on the error rate.

(Supplementary Note 6)

A receiving device for a quantum key distribution system, comprising:

a decoding unit configured to receive, from a transmitting device, a train of optical pulses which has been encoded and subjected to N types of intensity modulation having mutually different intensities, with different timings, where N is an integer which is not less than three, the decoding unit producing a data sequence obtained by decoding the train of optical pulses: and a second key distillation processing unit configured to generate an encryption key based on a data sequence obtained by removing data obtained from optical pulses having a specific modulation pattern from the data sequence obtained by the decoding.

(Supplementary Note 7)

The receiving device according to Supplementary Note 6, wherein the second key distillation processing unit is configured to determine data to be removed among the train of optical pulses based on data obtained from a current optical pulse and data obtained from an M-th preceding or an M-th succeeding optical pulse preceding or succeeding the current optical pulse, where M is an integer which is not less than one.

(Supplementary Note 8)

The receiving device according to Supplementary Note 6 or 7, wherein the second key distillation processing unit includes a decoy pulse as the modulation pattern and is configured to dispose of data having large intensity fluctuation.

(Supplementary Note 9)

The receiving device according to any one of Supplementary Notes 6 to 8, wherein the second key distillation processing unit is configured to dispose of at least data having the largest intensity fluctuation due to a pattern effect.

(Supplementary Note 10)

The receiving device according to any one of Supplementary Notes 6 to 9, wherein the second key distillation processing unit comprises a second basis verification processing portion, a second pattern disposal processing portion, and a second encryption key generating portion, wherein the second basis verification processing portion is configured to generate a first sifted key by randomly selecting a basis which is given to the data sequence of the train of optical pulses, wherein the second pattern disposal processing portion is configured to generate a second sifted key based on a data sequence obtained by removing, from the first sifted key, data obtained from a train of optical pulses having the specific modulation pattern, wherein the second encryption key generating portion is configured to generate the encryption key by calculating an error rate (QBER: Quantum Bit Error Rate) included in the second sifted key and by carrying out error correction and privacy amplification on the second sifted key based on the error rate.

(Supplementary Note 11)

A quantum key distribution method comprising generating an encryption key based on a data sequence obtained by removing data obtained from optical pulses having a specific modulation pattern from a data sequence used when a train of optical pulses are subjected to encoding and N types of intensity modulation having mutually different intensities, where N is an integer which is not less than three.

(Supplementary Note 12)

The quantum key distribution method according to Supplementary Note 11, comprising determining data to be removed among the train of optical pulses based on data obtained from a current optical pulse and data obtained from an M-th preceding or an M-th succeeding optical pulse preceding or succeeding the current optical pulse, where M is an integer which is not less than one.

(Supplementary Note 13)

The quantum key distribution method according to Supplementary Note 11 or 12, comprising including a decoy pulse as the modulation pattern: and disposing of data having large intensity fluctuation.

(Supplementary Note 14)

The quantum key distribution method according to any one of Supplementary Notes 11 to 13, comprising disposing of at least data having the largest intensity fluctuation due to a pattern effect.

(Supplementary Note 15)

The quantum key distribution method according to any one of Supplementary Notes 11 to 14, comprising:

generating a first sifted key based on a basis which is given to the data sequence of the train of optical pulses:

generating a second sifted key from the first sifted key based on a data sequence obtained by removing, from the data sequence of the train of optical pulses, data obtained from a train of optical pulses having the specific modulation pattern; and generating the encryption key by calculating an error rate (QBER: Quantum Bit Error Rate) included in the second sifted key and by carrying out error correction and privacy amplification on the second sifted key based on the error rate.

(Supplementary Note 16)

A quantum key distribution method comprising:

receiving, from a transmitting device, a train of optical pulses which has been encoded and subjected to N types of intensity modulation having mutually different intensities, with different timings, where N is an integer which is not less than three, to produce a data sequence obtained by decoding the train of optical pulses: and generating an encryption key based on a data sequence obtained by removing data obtained from optical pulses having a specific modulation pattern from the data sequence obtained by the decoding.

(Supplementary Note 17)

The quantum key distribution method according to Supplementary Note 16, comprising determining data to be removed among the train of optical pulses based on data obtained from a current optical pulse and data obtained from an M-th preceding or an M-th succeeding optical pulse preceding or succeeding the current optical pulse, where M is an integer which is not less than one.

(Supplementary Note 18)

The quantum key distribution method according to Supplementary Note 16 or 17, comprising including a decoy pulse as the modulation pattern; and disposing of data having large intensity fluctuation.

(Supplementary Note 19)

The quantum key distribution method according to any one of Supplementary Notes 16 to 18, comprising disposing of at least data having the largest intensity fluctuation due to a pattern effect.

(Supplementary Note 20)

The quantum key distribution method according to any one of Supplementary Notes 16 to 19, comprising:

generating a first sifted key by randomly selecting a basis which is given to the data sequence of the train of optical pulses:

generating a second sifted key based on a data sequence obtained by removing, from the first sifted key, data obtained from a train of optical pulses having the specific modulation pattern: and generating the encryption key by calculating an error rate (QBER: Quantum Bit Error Rate) included in the second sifted key and by carrying out error correction and privacy amplification on the second sifted key based on the error rate.

(Supplementary Note 21)

A quantum key distribution program for making a computer function as:

means for generating an encryption key based on a data sequence obtained by removing data obtained from optical pulses having a specific modulation pattern from a data sequence used when a train of optical pulses are subjected to encoding and N types of intensity modulation having mutually different intensities, where N is an integer which is not less than three.

(Supplementary Note 22)

The quantum key distribution program according to Supplementary Note 21, making the computer function as:

means for determining data to be removed among the train of optical pulses based on data obtained from a current optical pulse and data obtained from an M-th preceding or an M-th succeeding optical pulse preceding or succeeding the current optical pulse, where M is an integer which is not less than one.

(Supplementary Note 23)

The quantum key distribution program according to Supplementary Note 21 or 22, making the computer function as:

means for including a decoy pulse as the modulation pattern and disposing of data having large intensity fluctuation.

(Supplementary Note 24)

The quantum key distribution program according to any one of Supplementary Notes 21 to 23, making the computer function as:

means for disposing of at least data having the largest intensity fluctuation due to a pattern effect.

(Supplementary Note 25)

The quantum key distribution program according to any one of Supplementary Notes 21 to 24, making the computer function as:

means for generating a first sifted key based on a basis which is given to the data sequence of the train of optical pulses;

means for generating a second sifted key from the first sifted key based on a data sequence obtained by removing, from the data sequence of the train of optical pulses, data obtained from a train of optical pulses having the specific modulation pattern: and means for generating the encryption key by calculating an error rate (QBER: Quantum Bit Error Rate) included in the second sifted key and by carrying out error correction and privacy amplification on the second sifted key based on the error rate.

(Supplementary Note 26)

A quantum key distribution program for making a computer function as:

means for generating an encryption key based on a data sequence obtained by removing data obtained from optical pulses having a specific modulation pattern from a data sequence obtained by decoding a train of optical pulses which has been encoded and subjected to N types of intensity modulation having mutually different intensities, with different timings, where N is an integer which is not less than three.

(Supplementary Note 27)

The quantum key distribution program according to Supplementary Note 26, making the computer function as:

means for determining data to be removed among the train of optical pulses based on data obtained from a current optical pulse and data obtained from an M-th preceding or an M-th succeeding optical pulse preceding or succeeding the current optical pulse, where M is an integer which is not less than one.

(Supplementary Note 28)

The quantum key distribution program according to Supplementary Note 26 or 27, making the computer function as:

means for including a decoy pulse as the modulation pattern and disposing of data having large intensity fluctuation.

(Supplementary Note 29)

The quantum key distribution program according to any one of Supplementary Notes 26 to 28, making the computer function as:

means for disposing of at least data having the largest intensity fluctuation due to a pattern effect.

(Supplementary Note 30)

The quantum key distribution program according to any one of Supplementary Notes 26 to 29, making the computer function as:

means for generating a first sifted key by randomly selecting a basis which is given to the data sequence of the train of optical pulses;

means for generating a second sifted key based on a data sequence obtained by removing, from the first sifted key, data obtained from a train of optical pulses having the specific modulation pattern; and means for generating the encryption key by calculating an error rate (QBER: Quantum Bit Error Rate) included in the second sifted key and by carrying out error correction and privacy amplification on the second sifted key based on the error rate.

(Supplementary Note 31)

A quantum key distribution system comprising:

a transmitting device for the quantum key distribution system according to any one of Supplementary Notes 1 to 5; and a receiving device for the quantum key distribution system according to any one of Supplementary Notes 6 to 10.

EXPLANATION OF REFERENCE SIGNS 10, 10A, 110 transmitting device
11 encoding unit
12 intensity modulating unit
13 key distillation processing unit
13A first key distillation processing unit
20, 120 receiving device
21 decoding unit
22 second distillation processing unit
30, 100 quantum key distribution system
40 optical network
50 communication network
111 optical source unit
112 encoding unit
113 decoy modulating unit
114 optical attenuating unit
115 first key distillation processing unit
115a first basis verifying portion
115b first pattern disposal processing portion
115c first encryption key generating portion
121 decoding unit
122 optical detecting unit
123 second key distillation processing unit
123a second basis verifying portion
123b second pattern disposal processing portion
123c second encryption key generating portion
130 optical network
140 communication network
150a first encryption key
150b second encryption key
201a, 201b modulation signal
202a. 202b first optical pulse
203a, 203b second optical pulse
204a. 204b first modulation signal
205a, 205b second modulation signal
300 information processing apparatus
310 control unit
320 storage device
330 ROM (Read Only Memory)
340 RAM (Random Access Memory)
350 communication interface

The invention claimed is:

1. A transmitting device for a quantum key distribution system, comprising:

an encoding unit configured to encode a train of optical pulses;

an intensity modulating unit configured to subject a train of encoded optical pulses to N types of intensity modulation having mutually different intensities, with different timings, where N is an integer which is not less than three; and a first key distillation processing unit configured to generate an encryption key based on a data sequence obtained by removing data obtained from optical pulses having a specific modulation pattern from a data sequence used when the encoding unit and the intensity modulating unit carry out encoding and intensity modulation.

2. The transmitting device as claimed in claim 1, wherein the first key distillation processing unit is configured to determine data to be removed among the train of optical pulses based on data obtained from a current optical pulse and data obtained from an M-th preceding or an M-th succeeding optical pulse preceding or succeeding the current optical pulse, where M is an integer which is not less than one.

3. The transmitting device as claimed in claim 1, wherein the first key distillation processing unit includes a decoy pulse as the modulation pattern and is configured to dispose of data having large intensity fluctuation.

4. The transmitting device as claimed in claim 1, wherein the first key distillation processing unit is configured to dispose of at least data having the largest intensity fluctuation due to a pattern effect.

5. The transmitting device as claimed in claim 1,
wherein the first key distillation processing unit comprises a first basis verification processing portion, a first pattern disposal processing portion, and a first encryption key generating portion,
wherein the first basis verification processing portion is configured to generate a first sifted key based on a basis which is given to the data sequence of the train of optical pulses,
wherein the first pattern disposal processing portion is configured to generate a second sifted key from the first sifted key based on a data sequence obtained by removing, from the data sequence of the train of optical pulses, data obtained from a train of optical pulses having the specific modulation pattern,
wherein the first encryption key generating portion is configured to generate the encryption key by calculating an error rate (QBER: Quantum Bit Error Rate) included in the second sifted key and by carrying out error correction and privacy amplification on the second sifted key based on the error rate.

6. A receiving device for a quantum key distribution system, comprising:
a decoding unit configured to receive, from a transmitting device, a train of optical pulses which has been encoded and subjected to N types of intensity modulation having mutually different intensities, with different timings, where N is an integer which is not less than three, the decoding unit producing a data sequence obtained by decoding the train of optical pulses; and
a second key distillation processing unit configured to generate an encryption key based on a data sequence obtained by removing data obtained from optical pulses having a specific modulation pattern from the data sequence obtained by the decoding.

7. The receiving device as claimed in claim 6, wherein the second key distillation processing unit is configured to determine data to be removed among the train of optical pulses based on data obtained from a current optical pulse and data obtained from an M-th preceding or an M-th succeeding optical pulse preceding or succeeding the current optical pulse, where M is an integer which is not less than one.

8. The receiving device as claimed in claim 6, wherein the second key distillation processing unit includes a decoy pulse as the modulation pattern and is configured to dispose of data having large intensity fluctuation.

9. The receiving device as claimed in claim 6, wherein the second key distillation processing unit is configured to dispose of at least data having the largest intensity fluctuation due to a pattern effect.

10. The receiving device as claimed in claim 6,
wherein the second key distillation processing unit comprises a second basis verification processing portion, a second pattern disposal processing portion, and a second encryption key generating portion,
wherein the second basis verification processing portion is configured to generate a first sifted key by randomly selecting a basis which is given to the data sequence of the train of optical pulses,
wherein the second pattern disposal processing portion is configured to generate a second sifted key based on a data sequence obtained by removing, from the first sifted key, data obtained from a train of optical pulses having the specific modulation pattern,
wherein the second encryption key generating portion is configured to generate the encryption key by calculating an error rate (QBER: Quantum Bit Error Rate) included in the second sifted key and by carrying out error correction and privacy amplification on the second sifted key based on the error rate.

11. A quantum key distribution method comprising generating an encryption key based on a data sequence obtained by removing data obtained from optical pulses having a specific modulation pattern from a data sequence used when a train of optical pulses are subjected to encoding and N types of intensity modulation having mutually different intensities, where N is an integer which is not less than three.

12. The quantum key distribution method as claimed in claim 11, comprising determining data to be removed among the train of optical pulses based on data obtained from a current optical pulse and data obtained from an M-th preceding or an M-th succeeding optical pulse preceding or succeeding the current optical pulse, where M is an integer which is not less than one.

13. The quantum key distribution method as claimed in claim 11, comprising including a decoy pulse as the modulation pattern; and disposing of data having large intensity fluctuation.

14. The quantum key distribution method as claimed in claim 11, comprising disposing of at least data having the largest intensity fluctuation due to a pattern effect.

15. The quantum key distribution method as claimed in claim 11, comprising:
generating a first sifted key based on a basis which is given to the data sequence of the train of optical pulses;
generating a second sifted key from the first sifted key based on a data sequence obtained by removing, from the data sequence of the train of optical pulses, data obtained from a train of optical pulses having the specific modulation pattern; and
generating the encryption key by calculating an error rate (QBER: Quantum Bit Error Rate) included in the second sifted key and by carrying out error correction and privacy amplification on the second sifted key based on the error rate.

16. A quantum key distribution method comprising:
receiving, from a transmitting device, a train of optical pulses which has been encoded and subjected to N types of intensity modulation having mutually different intensities, with different timings, where N is an integer which is not less than three, to produce a data sequence obtained by decoding the train of optical pulses; and
generating an encryption key based on a data sequence obtained by removing data obtained from optical pulses having a specific modulation pattern from the data sequence obtained by the decoding.

17. The quantum key distribution method as claimed in claim 16, comprising determining data to be removed among the train of optical pulses based on data obtained from a current optical pulse and data obtained from an M-th preceding or an M-th succeeding optical pulse preceding or succeeding the current optical pulse, where M is an integer which is not less than one.

18. The quantum key distribution method as claimed in claim 16, comprising including a decoy pulse as the modulation pattern; and disposing of data having large intensity fluctuation.

19. The quantum key distribution method as claimed in claim 16, comprising disposing of at least data having the largest intensity fluctuation due to a pattern effect.

20. The quantum key distribution method as claimed in claim 16, comprising:
generating a first sifted key by randomly selecting a basis which is given to the data sequence of the train of optical pulses;
generating a second sifted key based on a data sequence obtained by removing, from the first sifted key, data obtained from a train of optical pulses having the specific modulation pattern; and
generating the encryption key by calculating an error rate (QBER: Quantum Bit Error Rate) included in the second sifted key and by carrying out error correction and privacy amplification on the second sifted key based on the error rate.

21. A non-transitory computer readable medium for storing a quantum key distribution program for making a computer function as:
means for generating an encryption key based on a data sequence obtained by removing data obtained from optical pulses having a specific modulation pattern from a data sequence used when a train of optical pulses are subjected to encoding and N types of intensity modulation having mutually different intensities, where N is an integer which is not less than three; and means for determining data to be removed among the train of optical pulses based on data obtained from a current optical pulse and data obtained from an M-th preceding or an M-th succeeding optical pulse preceding or succeeding the current optical pulse, where M is an integer which is not less than one.

22. The non-transitory computer readable medium as claimed in claim 21, the quantum key distribution program making the computer function as:

means for including a decoy pulse as the modulation pattern and disposing of data having large intensity fluctuation.

23. The non-transitory computer readable medium as claimed in claim 21, the quantum key distribution program making the computer function as:

means for disposing of at least data having the largest intensity fluctuation due to a pattern effect.

24. The non-transitory computer readable medium as claimed in claim 21, the quantum key distribution program making the computer function as:

means for generating a first sifted key based on a basis which is given to the data sequence of the train of optical pulses;

means for generating a second sifted key from the first sifted key based on a data sequence obtained by removing, from the data sequence of the train of optical pulses, data obtained from a train of optical pulses having the specific modulation pattern; and means for generating the encryption key by calculating an error rate (QBER: Quantum Bit Error Rate) included in the second sifted key and by carrying out error correction and privacy amplification on the second sifted key based on the error rate.

25. A non-transitory computer readable medium for storing a quantum key distribution program for making a computer function as:

means for generating an encryption key based on a data sequence obtained by removing data obtained from optical pulses having a specific modulation pattern from a data sequence obtained by decoding a train of optical pulses which has been encoded and subjected to N types of intensity modulation having mutually different intensities, with different timings, where N is an integer which is not less than three; and means for determining data to be removed among the train of optical pulses based on data obtained from a current optical pulse and data obtained from an M-th preceding or an M-th succeeding optical pulse preceding or succeeding the current optical pulse, where M is an integer which is not less than one.

26. The non-transitory computer readable medium as claimed in claim 25, the quantum key distribution program making the computer function as:

means for including a decoy pulse as the modulation pattern and disposing of data having large intensity fluctuation.

27. The non-transitory computer readable medium as claimed in claim 25, the quantum key distribution program making the computer function as:

means for disposing of at least data having the largest intensity fluctuation due to a pattern effect.

28. The non-transitory computer readable medium as claimed in claim 25, the quantum key distribution program making the computer function as:

means for generating a first sifted key by randomly selecting a basis which is given to the data sequence of the train of optical pulses;

means for generating a second sifted key based on a data sequence obtained by removing, from the first sifted key, data obtained from a train of optical pulses having the specific modulation pattern; and means for generating the encryption key by calculating an error rate (QBER: Quantum Bit Error Rate) included in the second sifted key and by carrying out error correction and privacy amplification on the second sifted key based on the error rate.

29. A quantum key distribution system comprising:

a transmitting device; and a receiving device, wherein the transmitting device comprises:

an encoding unit configured to encode a train of optical pulses;

an intensity modulating unit configured to subject a train of encoded optical pulses to N types of intensity modulation having mutually different intensities, with different timings, where N is an integer which is not less than three; and a first key distillation processing unit configured to generate an encryption key based on a data sequence obtained by removing data obtained from optical pulses having a specific modulation pattern from a data sequence used when the encoding unit and the intensity modulating unit carry out encoding and intensity modulation, wherein the receiving device comprises:

a decoding unit configured to receive, from a transmitting device, a train of optical pulses which has been encoded and subjected to N types of intensity modulation having mutually different intensities, with different timings, where N is an integer which is not less than three, the decoding unit producing a data sequence obtained by decoding the train of optical pulses; and a second key distillation processing unit configured to generate an encryption key based on a data sequence obtained by removing data obtained from optical pulses having a specific modulation pattern from the data sequence obtained by the decoding.

\* \* \* \* \*